United States Patent [19]
Van Dornick

[11] 3,870,534
[45] Mar. 11, 1975

[54] MAINTENANCE OF HIGH HEAT EXCHANGE TRANSFER RATES AND IMPROVED ALKALI DESUBLIMATION CONDITIONS IN PORTLAND CEMENT PRODUCTION

[76] Inventor: Edward M. Van Dornick, 1150 Fallen Leaf Rd., Arcadia, Calif. 91006

[22] Filed: May 25, 1973

[21] Appl. No.: 363,815

[52] U.S. Cl. .................................. 106/100, 432/15
[51] Int. Cl. .............................................. C04b 7/36
[58] Field of Search ......... 106/100; 432/15, 58, 106

[56] References Cited
UNITED STATES PATENTS

| | | | |
|---|---|---|---|
| 818,018 | 4/1906 | Doherty | 106/100 |
| 1,791,800 | 2/1931 | Colton | 106/100 |
| 3,622,363 | 11/1971 | Van Dornick | 106/100 |

Primary Examiner—James E. Poer
Assistant Examiner—John P. Sheehan
Attorney, Agent, or Firm—Harris, Kern, Wallen & Tinsley

[57] ABSTRACT

The present method of Portland cement production provides for mixing with a fluidized raw mix stream to be heat exchanged, and an alkali-containing gas stream to be desublimed, appropriate quantities of granular fluidized solids, preferably in the 4 to 20 standard mesh size, the added solids acting as scouring agents to maintain clean, deposit-free heat transfer surfaces, and an unobstructed desublimation chamber.

13 Claims, 4 Drawing Figures

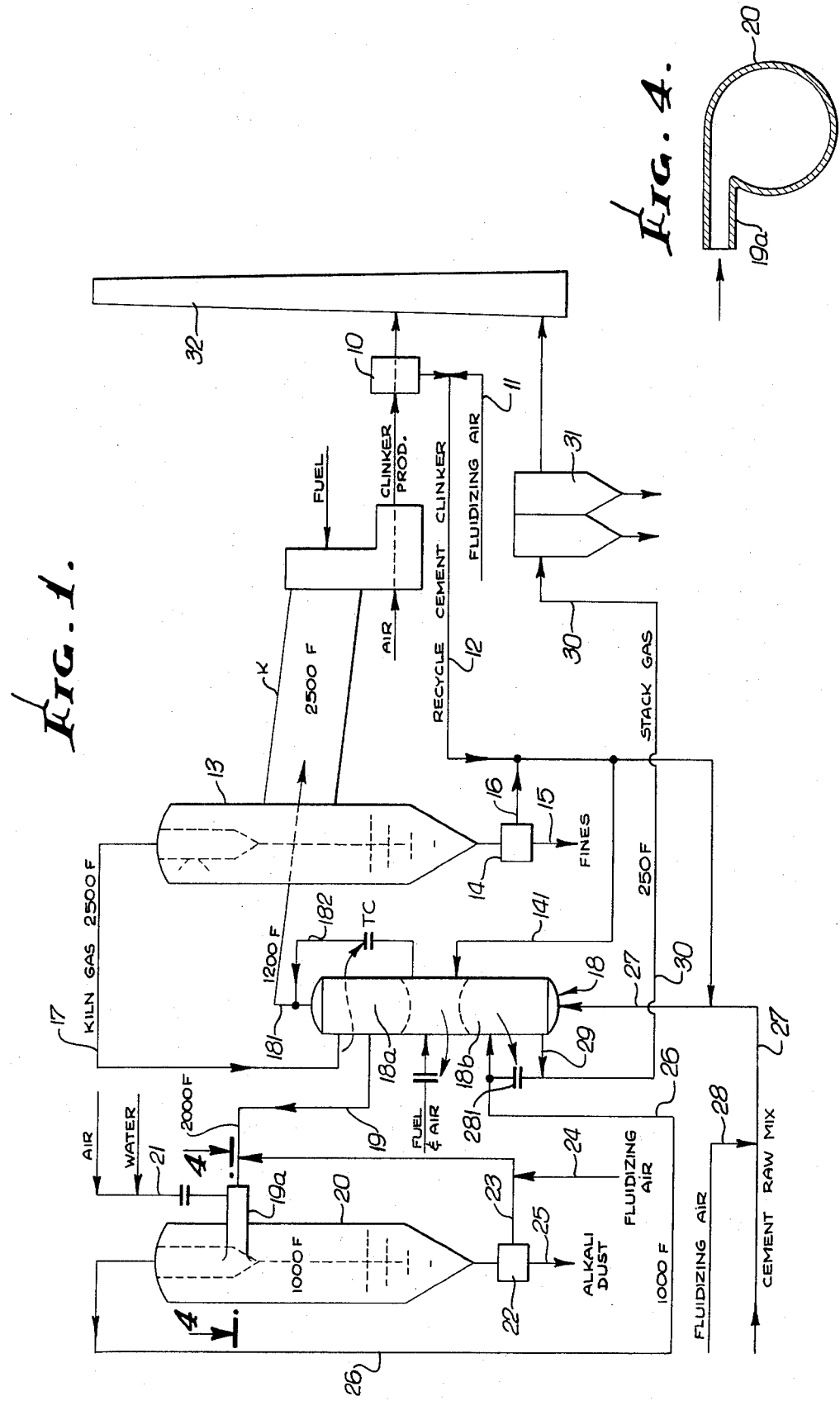

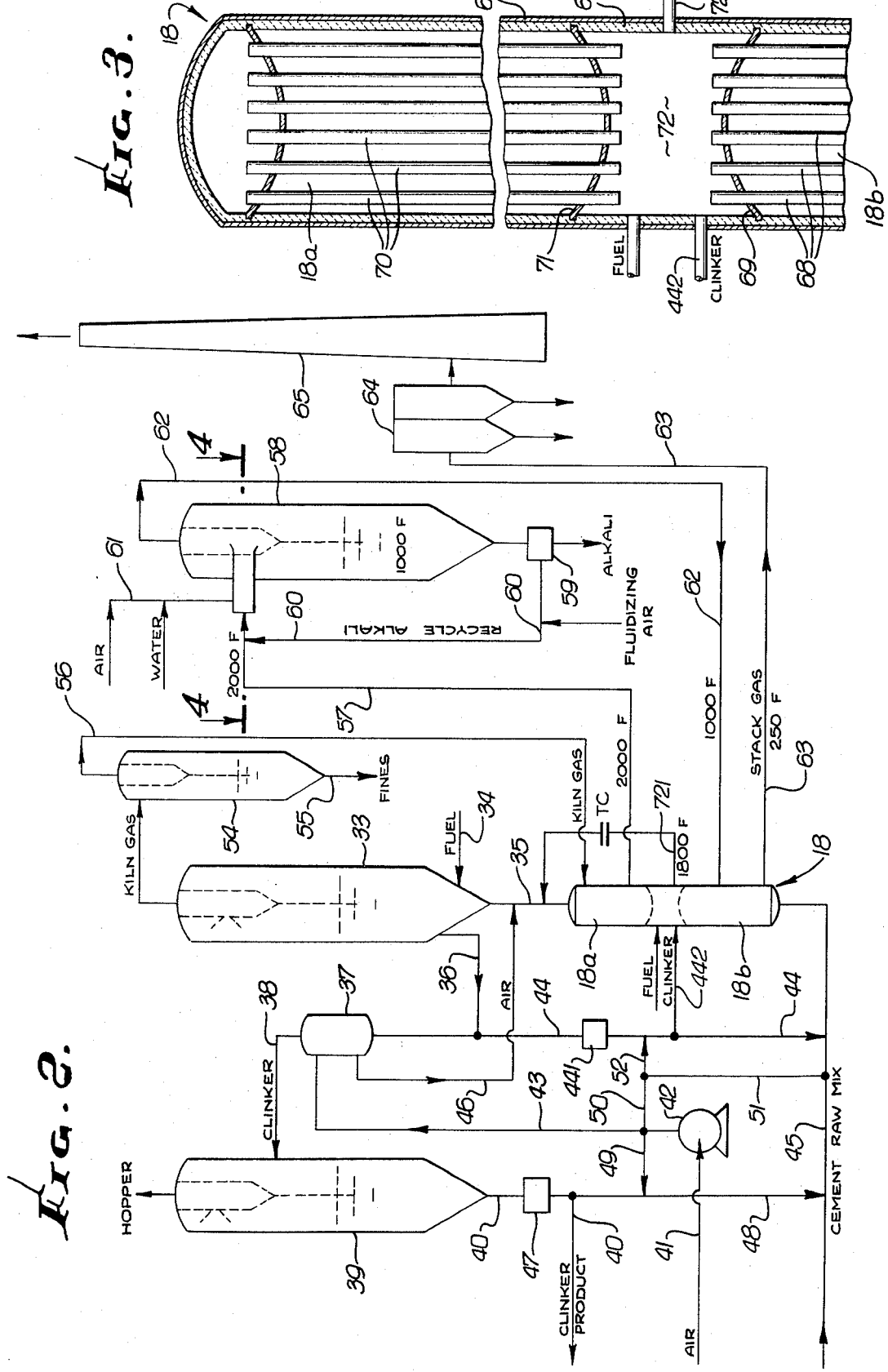

MAINTENANCE OF HIGH HEAT EXCHANGE TRANSFER RATES AND IMPROVED ALKALI DESUBLIMATION CONDITIONS IN PORTLAND CEMENT PRODUCTION

BACKGROUND OF THE INVENTION

Fluidized solids heat exchange equipment as employed in Portland cement plants include vertical multi-tubes within an outer shell with the fluidized solids streams flowing inside the tubes. The invention is concerned with the use of such exchangers serving to preheat fluidized Portland cement raw mix by heat exchange with hot gases from a calcining zone. The number of tubes in parallel is based on the desired flow rate for the fluidized solids stream to achieve the desired film factor and heat transfer rate at an acceptable pressure loss.

Frequently encountered are raw mix compositions productive during the preheating stage of adhering and selfclogging materials tending to rapidly form films on the inside walls of the tubes to such an extent as to effectively destroy their heat transfer capability and eventually to plug the tubes with an ever increasing deposit thickness greatly restricting the flow rate. Resultant diminished heat transfer and flow rates can be effectively halt acceptable economic operation of the plant.

In the production of Portland cement wherein salts, i.e., sodium and potassium chloride, are sublimed at the high temperatures required for clinkering of the cement and are converted to alkali oxides, it is desirable to rid the process of deleterious alkali. Desublimation equipment has been proposed in the form of a large chamber in which cooling of the alkali-containing gases and vapors results from their admixture with a cooling medium such as air or water. Efficiency in the desublimation stage may be impaired by rapid accumulation on the chamber walls of desublimed alkali to an extent that the chamber becomes clogged against normal gas flow and effective removal of the desublimed alkali.

SUMMARY OF THE INVENTION

The present invention contemplates methods for continuously self-cleaning fluidized solids tubular heat exchange equipment and desublimation equipment without interrupting normal plant operation. The self-cleaning function is accomplished as an integral part of the process operation as a result of the flow of fluidized solids introduced to gaseous media so as to have scouring contact with the surfaces to be kept free from accumulated solids.

The invention achieves an essentially continuouslyy operated ideal condition by admixing with the cement raw mix typically from about 10 to 100 percent by weight of granular hard abrasive 4 to 20 mesh cement clinker particles recycled within the process, and subjecting the desublimation chamber walls to the scouring action of recycled alkali effluent. In the case of a fluidized reactor type plant the fluidized clinker is the preferred recycle stream either from the reactor or a clinker hopper. The reactor clinker would be hot and approximately at the reactor temperature whereas the hopper clinker would be relatively cold or at the clinker hopper temperature. Either or both hot cold recycles may be used at the same time depending on the process design requirements. For a rotary kiln type plant the fluidized clinker may originate from a screening operation to yield a 4 to 20 mesh recycle stream from the clinker product grinding operation.

Recycle ratios of granular fluidized clinker depend on the adhering and agglomerating characteristics of the raw mix and flow conditions prevailing. Nominally, a ratio range of 0.1 to 1 lb. of recycle clinker per pound of raw mix will suffice to insure continuous free flowing non-adhering, self-cleaning operation of the heat exchange equipment.

Concerning the alkali removal stage, the desublimed alkali oxides are deposited and mixed with cement fines and recycled as 10 to 20 mesh fluidized solids resulting from screening of the alkali-cement fines. These may be recycled at an appropriate ratio which may range from 5 to 10 parts of recycle to 1 part of newly desublimed alkali. Recycle alkali-salt-cement fines are mixed with the desublimation process stream at the entrance to the chamber together with the chilling media. Of particular importance is direction of the gas-solids entry to the chamber in tangential relation to its wall so that the gas entrained granular solids will continuously scour clean the walls of the vessel.

Further features and objectives of the invention as well as the details of illustrative embodiments will be more fully understood from the following description of the accompanying drawing.

BRIEF DESCRIPTION OF THE DRAWINGS

FIG. 1 is a showing diagrammatically and in flow sheet form of the invention as embodied in a conventional rotary kiln process for Portland cement production;

FIG. 2 is a similar showing of a system embodying the invention and in which the reactor or calcining zone contains a fluidized bed of the reactants within a vertically extended column;

FIG. 3 is a fragmentary enlargement of the raw mix heat exchanger; and

FIG. 4 is an enlarged cross section through the alkali desubliming zone actual inlet configuration if viewed from lines 4—4 of diagrammatic FIGS. 1 and 2.

Temperatures indicated at various stages in the processes are intended to be approximate and illustrative only. Also the flow sheets are not intended to show various details and additions employed in actual cement plants but only those basic stages related to a full understanding of the invention.

In reference first to FIG. 1, the calcining zone is within a rotary kiln K to which fuel and air are fed from the correspondingly indicated lines, ultimately to be admixed in combustible ratio and discharged into the product outlet end of the kiln. The clinker product flows to grinding mill 10 from which screened-out fines are circulated with fluidizing air from line 11 through line 12 to serve as an exchanger scouring medium as will later appear. The hot kiln gases enter separator 13 from which separated cement mix particles pass from the bottom of the separator to screening chamber 14 from which the coarser particles are discharged through line 16 connecting with the recirculation line 12 and the fines through line 15.

The overhead gases from separator 13 pass through line 17 into the shell space within the exchanger generally indicated at 18, the gas flow being directed into the upper section 18a of the exchanger which receives the gas-entrained raw mix from the tubes of the lower exchanger section 18b as will be explained in greater detail. From the upper exchanger section 18a the partially cooled kiln gases pass through line 19 to quench chamber 20. It is to be understood that this quench stage may not necessarily be used where the alkali content of the raw mix is so low as to not warrant alkali separation and recovery in a quench stage.

When employed, the quench chamber 20 receives the hot gases from line 19 at a temperature sufficiently high to carry the alkali in sublimed form so that the function of the chamber becomes that of a desubliming zone within which the alkali undergoes particulate solidification by admixture with a cooling medium such as air or water introduced through line 21. As previously observed, the alkali desublimate in the absence of a removal medium tends to accumulate on the walls of the chamber to a degree of build-up seriously reducing the volume of the chamber below the gas capacity required for effective alkali desublimation.

This condition is eliminated as illustrated in FIG. 4 by introduction of the line 19 gas stream through inlet 19a positioned tangentially in relation to the chamber so that the entering gas, together with solid recycle particles, travel an outwardly maintained swirling and scouring flow by centrifugal force in contact with the chamber wall. The scouring particles are derived by passage of the desublimate through a separating zone 22 wherein desirable size particles are screened for removal through line 23 and recycled with fluidizing air from line 24 to be returned to the inlet 19a for re-entry to the chamber admixed with the line 19 gas. The screened alkali dust is removed to disposal through line 25. The chamber 20 overhead gas is taken through line 26 for introduction into the lower section 18b of the exchanger 18.

The desublimation chamber receives a gaseous mixture of sublimed alkali and cement mix particles as incompletely removed fines. These particles together with the sublimate serve as nuclei for the development and formation of the solid sublimate settling to the bottom of the chamber. Thus the separated alkali particles so constituted serve effectively as the chamber wall scouring medium when recycled to the chamber inlet 19a.

Ground raw mix calcinable to produce Portland Cement clinker is fed to the system through line 27 together with fluidizing air from line 28 in a conventional manner, the solid raw mix particles thus becoming air-entrained for passage through the tubes in the lower exchanger section 18b. Under control of temperature responsive regulator 281a portion of the line 26 gas enters the exchanger shell about the tubes and the remainder of the gas stream together with the shell chamber effluent through line 29 pass by way of line 30 and separators 31 to the stack 32.

The fluidizing bed calcining system illustrated in FIG. 2 is of the general type disclosed in the Van Dornick U.S. Pat. No. 3,622,363. Here the calcining zone is within a vertically extended column 33 to the base of which fuel and gas-entrained raw mix are introduced respectively through lines 34 and 35 to be maintained in an ebulliating state during conversion to Portland cement clinker which is withdrawn through line 36. The clinker passes through exchanger 37 and line 38 to hopper 39 from which the product is withdrawn through line 40. Air is introduced to the system through line 41 to be compressed at 42 and preheated in passage through line 43 and exchanger 37. Air preheated in exchanger 37 passes through line 46 for admixture with the air-entrained mix entering the bottom of the calcining zone 33 through line 35 after leaving the upper exchanger section 18a.

Leaving the bottom of hopper 39 a portion of the clinker product may be screened out at 47 to produce 4 to 20 mesh clinker for passage through line 48 and admixture with the raw mix being introduced to the system through line 45. Air discharged from compressor 42 in addition to being heat exchanged at 37 for delivery to the calcining zone may also be taken through lines 49 and 50 for particle entrainment of the line 48 clinker and through line 51 for use in subsequent entrainment of the clinker-raw mix admixture. If desired the clinker flow from the calcining zone through line 36 may be supplemented by compressed air from the branch 52.

The overhead from the calcining zone 33 passes to separator 54 from which solid fines are taken to disposal through line 55, the overhead then passing through line 56 into the upper shell section of exchanger 18 outside its tubes. After passage through the exchanger the line 56 gas flows through line 57 to be introduced to the quench chamber 58. Again, this stage will be employed in those situations where warranted by the alkali content of the raw mix. The functions and mode of operation of the quench chamber including alkali particle screening at 59 and recycle of screened alkali with fluidizing air through line 60, also the introduction of quenching fluid at 61, are the same as previously described with reference to FIG. 1 and need not be repeated.

In further reference to the flow path through exchanger 18 in FIG. 2, it may be mentioned that the exchanger structure more particularly illustrated in FIG. 3, is the same in both FIGS. 1 and 2 and its parts are identified by the same reference numerals. In FIg. 2, the gas effluent from the chamber 58 passes through line 62 into the lower exchanger shell section 18b outside its tubes and the cooled gases are then passed through line 63 to the separators 64 and thence to the stack 65.

The exchanger structure shows its upper and lower sections 18a and 18b to be contained within a common shell 66 having a refractory lining 67 and containing elongated tubes 68 in the lower section and tubes 70 in the upper section, the tubes passing through dished heads or sheets 69 and 71 spaced apart to define a mixing chamber 72. As will be understood, the lower section tubes 68 receive fluidized ground raw mix from line 27 in FIG. 1 or line 45 in FIG. 2 and the fluidized raw mix and clinker particles are discharged from the lower section tubes into the mixing chamber 72 and then through the upper section tubes 70 to exit the exchanger through line 181 in FIG. 1 to enter the kiln K and through line 35 in FIG. 2 as feed to the fluidized bed in column 33.

As illustrated, a gas temperature controlled by-pass line 182 may operate in conjunction with the gas flow through the upper exchanger section 18a in FIG. 1. Similarly in FIG. 2 a temperature controlled by-pass line 721 may operate to pass controlled gas flow from chamber 72 to line 31. Ground clinker is introduced to chamber 72 from line 141 in FIG. 1 and from line 442 in FIG. 2 as a side stream from line 44 after passage through a screening zone 441 which classifies the clinker particles within the desired 4 to 20 mesh size. In FIG. 3, the fuel and clinker supply lines leading to mixing chamber 72 and by-pass line 721, correspond, in FIG. 2, to the fuel and clinker supply lines entering exchanger 18 and by-pass line 721 leaving exchanger 18. The fuel and air mixture and clinker particles are turbulently admixed in chamber 72 thus to achieve uniformity in the gas-solids composition entering the bottoms of tubes 70.

As an illustration of the foregoing, in the case of a 5 million barrel per year Portland cement plant processing a 2 percent salt content stone, the fluidized solids heat exchanger 18 recovering heat from the hot kiln or reactor gases by preheating raw cement mix would comprise 575 parallel vertical 2½ inch diameter tubes, 20 feet long contained in a refractory lined steel shell witih dished heads utilized as the tube sheets. Two such units in series are required to accommodate the process flow heat recovery arrangement.

Flow through the tubes consists of 290 tons per hour of a homogeneous fluidized solids mix of 145 tons of raw cement mix and 145 tons of 4 to 20 mesh cement clinker. Upon leaving the heat recovery equipment the preheated mix with contained recycle material is introduced to the fluid reactor or rotary kiln for the clinkering reaction.

The desublimation operation comprises mixing the sublimed alkali-containing vapors and gases with a chilling air stream sufficient to chill the gases to desublimation temperature and containing nominally 15 tons per hour of 10 to 20 mesh alkali/cement fines originated from a screening operation of the recovered material from preceding desublimation. The fines act as condensation nuclei and also as a scouring media to maintain deposit-free walls and internal equipment and a free-flowing fluidized bottoms product.

I claim:

1. In a system for the production of Portland cement wherein gas-entrained raw mix is fed through a heat exchange zone to a calcining zone from which hot clinker and gases are separately discharged and wherein said heat exchange zone comprises multiple vertical tubes through which the raw mix flows in heat transfer relation with hot gases from the calcining zone; the process of maintaining high heat transfer rates from the kiln gases to the entrained raw mix within the heat exchange zone that includes recycling gas-entrained solid clinker particles from the calcining zone and introducing said particles to the raw mix streams flowing through the tubes so that the clinker particles become gas-entrained therewith and exert scouring and cleaning action against the inside surfaces of the tubes.

2. The system of claim 1 in which said clinker particles are in the 4 to 20 standard mesh size.

3. The system of claim 1 in which said heat exchange zone comprises a chamber to which the clinker particles are introduced in gas-fluidized flow and within which the particles are turbulently admixed with the gasentrained raw mix before entering said tubes.

4. The system of claim 1 in which the clinker particles are introduced to a mixing chamber between assemblages of terminally spaced tubes within upper and lower extents of the heat exchange zone.

5. The system of claim 1 in which the clinker from said calcining zone is screened to produce particles within the 4 to 20 standard mesh size and the screened particles are gas-entrained and introduced to a mixing chamber within the heat exchange zone between assemblages of upper and lower tubes therein.

6. The system of claim 1 in which the gases from the calcining zone contain sublimed alkali and undergo cooling in an alkali desublimation zone.

7. The system of claim 6 in which alkali desublimate particles are recycled from said desublimation zone to the kiln gas stream entering said desublimation zone.

8. The system of claim 7 in which the kiln gases and recycled alkali particles are directed tangentially into the desublimation chamber to have centrifugal swirling solid particle scouring contact with its walls.

9. The system of claim 8 in which the recycled alkali particles are screened to have about 10 to 20 standard mesh size.

10. The system of claim 1 in which said calcining zone is within a rotary kiln.

11. The system of claim 6 in which said calcining zone is within a rotary kiln.

12. The system of claim 1 in which said calcining zone is within a column containing ebulliating raw mix undergoing conversion to cement clinker.

13. The system of claim 6 in which said calcining zone is within a column containing ebulliating raw mix undergoing conversion to cement clinker.

* * * * *

UNITED STATES PATENT OFFICE
CERTIFICATE OF CORRECTION

PATENT NO. : 3,870,534
DATED : March 11, 1975
INVENTOR(S) : Edward M. Van Dornick It is certified that error appears in the above-identified patent and that said Letters Patent are hereby corrected as shown below:

Column 1, line 26, after "can" delete --be--

Column 1, line 53, "continuouslyy" should be --continuously--

Column 1, line 65, after "hot" insert --or--

Column 4, line 64, "31" should be --35--

Column 6, line 12 (Claim 3), "gasentrained" should be --gas-entrained--

Signed and Sealed this twenty-second Day of July 1975

[SEAL]

Attest:

RUTH C. MASON
Attesting Officer

C. MARSHALL DANN
Commissioner of Patents and Trademarks